United States Patent
Friedhoff et al.

(10) Patent No.: US 7,995,854 B2
(45) Date of Patent: Aug. 9, 2011

(54) SYSTEM AND METHOD FOR IDENTIFYING COMPLEX TOKENS IN AN IMAGE

(75) Inventors: Richard Mark Friedhoff, New York, NY (US); Casey Arthur Smith, Ithaca, NY (US); Bruce Allen Maxwell, Benton, ME (US)

(73) Assignee: Tandent Vision Science, Inc., San Francisco, CA (US)

( * ) Notice: Subject to any disclaimer, the term of this patent is extended or adjusted under 35 U.S.C. 154(b) by 754 days.

(21) Appl. No.: 12/079,877

(22) Filed: Mar. 28, 2008

(65) Prior Publication Data

US 2009/0245651 A1    Oct. 1, 2009

(51) Int. Cl.
   *G06K 9/40* (2006.01)

(52) U.S. Cl. ........ 382/260; 382/254; 382/195; 382/199; 382/225

(58) Field of Classification Search ............ 382/254, 382/260, 199, 195, 225
See application file for complete search history.

(56) References Cited

U.S. PATENT DOCUMENTS

| | | | | |
|---|---|---|---|---|
| 4,685,143 A | * | 8/1987 | Choate | 382/170 |
| 5,420,971 A | * | 5/1995 | Westerink et al. | 382/199 |
| 5,495,536 A | | 2/1996 | Osbourn | 382/199 |
| 5,625,717 A | * | 4/1997 | Hashimoto et al. | 382/260 |
| 5,933,518 A | | 8/1999 | Cohen-Solal | 382/132 |
| 6,469,706 B1 | * | 10/2002 | Syeda-Mahmood | 345/589 |
| 6,577,758 B1 | * | 6/2003 | Kawata et al. | 382/151 |
| 6,654,055 B1 | * | 11/2003 | Park et al. | 348/242 |
| 6,792,159 B1 | * | 9/2004 | Aufrichtig et al. | 382/260 |
| 7,136,537 B2 | * | 11/2006 | Pilu et al. | 382/274 |
| 7,231,080 B2 | * | 6/2007 | Hakim et al. | 382/149 |
| 7,236,643 B2 | * | 6/2007 | Albertelli et al. | 382/270 |
| 7,499,570 B2 | * | 3/2009 | Zoghlami et al. | 382/103 |
| 7,813,582 B1 | * | 10/2010 | Chaudhury et al. | 382/263 |
| 2002/0176023 A1 | * | 11/2002 | Hofflinger et al. | 348/645 |
| 2003/0086608 A1 | * | 5/2003 | Frost et al. | 382/173 |
| 2003/0095704 A1 | * | 5/2003 | Risson | 382/162 |
| 2003/0095721 A1 | * | 5/2003 | Clune et al. | 382/294 |
| 2003/0156761 A1 | * | 8/2003 | Ogata et al. | 382/251 |
| 2003/0207328 A1 | * | 11/2003 | Yguerabide et al. | 435/7.1 |
| 2004/0183812 A1 | * | 9/2004 | Raskar et al. | 345/582 |

(Continued)

FOREIGN PATENT DOCUMENTS

JP    2005309772 A   * 11/2005

OTHER PUBLICATIONS

Ambient illumination—changes, Gershon et al., Optical society of America, 0740-3232, 1986, pp. 1700-1707.*

(Continued)

*Primary Examiner* — Samir Ahmed
*Assistant Examiner* — Jayesh A Patel
(74) *Attorney, Agent, or Firm* — Davidson, Davidson & Kappel, LLC; Felix L. D'Arienzo, Jr.

(57) ABSTRACT

In a first exemplary embodiment of the present invention, an automated, computerized method is provided for processing an image. According to a feature of the present invention, the method comprises the step of performing a filter response technique to identify patches of uniform reflectance within the image. In a further exemplary embodiment, the method comprises the additional step of utilizing the identified patches of uniform material reflectance to generate single material token regions for use in processing material and illumination aspects of the image.

13 Claims, 16 Drawing Sheets

Generalized Identification of
Regions of Uniform Reflectance

U.S. PATENT DOCUMENTS

| | | | |
|---|---|---|---|
| 2005/0100220 A1* | 5/2005 | Keaton et al. | 382/191 |
| 2006/0018539 A1* | 1/2006 | Sato et al. | 382/173 |
| 2006/0074835 A1* | 4/2006 | Maggioni et al. | 706/45 |
| 2007/0177797 A1* | 8/2007 | Smith et al. | 382/164 |
| 2007/0242878 A1* | 10/2007 | Maxwell et al. | 382/168 |
| 2007/0285698 A1* | 12/2007 | Wang et al. | 358/1.13 |
| 2008/0002872 A1* | 1/2008 | Gatesoupe et al. | 382/132 |

OTHER PUBLICATIONS

Randen, T.[Trygve], Husøy, J.H.[John Håkon] "Filtering for Texture Classification: A Comparative Study," PAMI(21), No. 4, Apr. 1999, pp. 291-310.

P. Felzenszwalb and D. Huttenlocher "Distance Transforms of Sampled Functions," *Cornell Computing and Information Science Technical Report.* TR2004-1963, Sep. 2004, pp. 1-15.

Abdi,H. (2007), "Z-scores," in N. J. Salkind (Ed.), *Encyclopedia of Measurement and Statistics,* Thousand Oaks, CA: Sage, pp. 1-4.

Peter J. Rousseeuw "Least Median of Squares Regression," *Journal of the American Statistical Association,* vol. 79, No. 388 (Dec. 1984), pp. 871-880.

Zvi Galil and Giuseppe F. Italiano "Data Structures and Algorithms for Disjoint Set Union Problems," *ACM Computing Surveys,* vol. 23, Issue 3 (Sep. 1991), pp. 319-344.

M. A. Fischler, R. C. Bolles "Random Sample Consensus: A Paradigm for Model Fitting with Applications to Image Analysis and Automated Cartography," *Comm. of the ACM,* vol. 24, pp. 381-395, 1981.

Marshall F. Tappen et al.:"Recovering Intrinsic Images from a Single Image," IEEE Transactions on Pattern Analysis and Machine Intelligence, vol. 27, No. 9, Sep. 2005, 14 pages.

\* cited by examiner

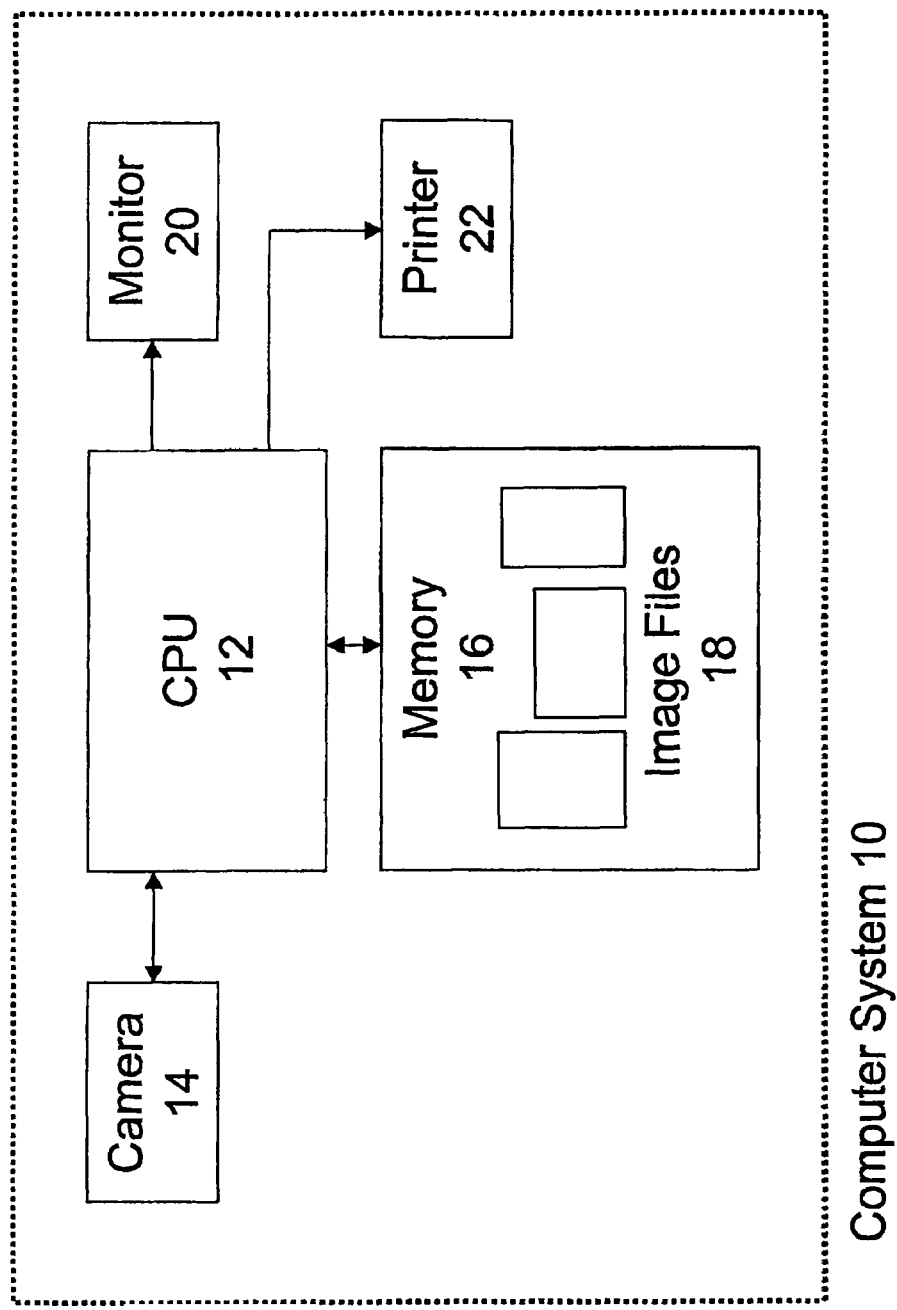
Figure 1: Computer System Configured to Operate on Images

| P(1, 1) | P(1, 2) | ... | P(1, M) |
| --- | --- | --- | --- |
| P(2, 1) | P(2, 2) | ... | |
| P(3, 1) | P(3, 2) | | |
| ... | | | |
| P(N, 1) | ... | ... | P(N, M) |

Figure 2: Pixel Array for Storing Image Data

Image File 18

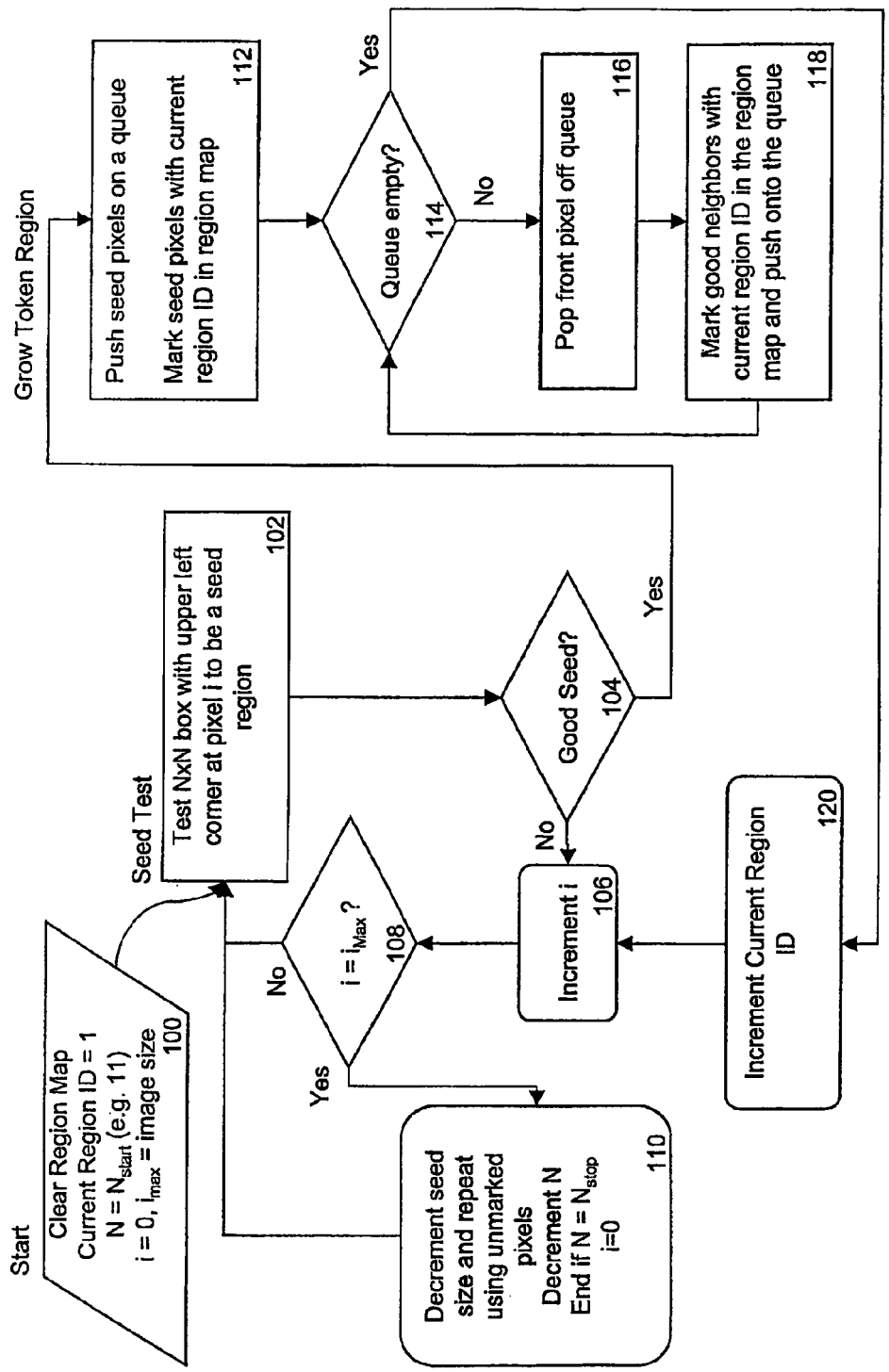
Figure 3A: Identifying Token Regions in an Image

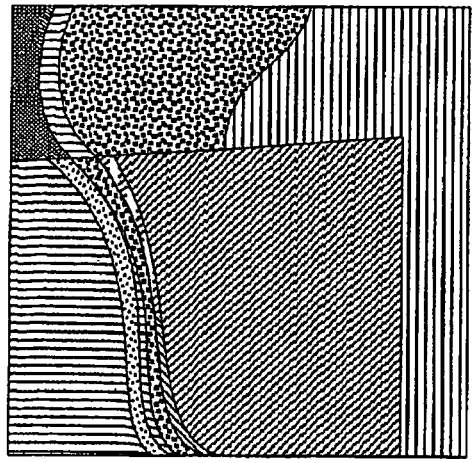
Figure 3C: Token Regions
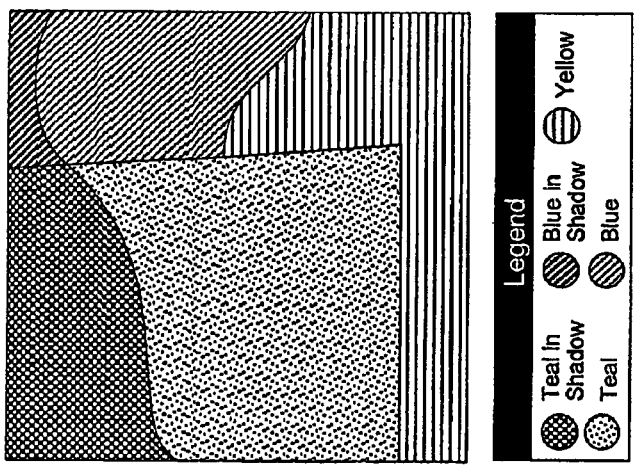
Figure 3B: Original Image
Figure 3B, 3C: Examples of Identifying Token Regions in an Image

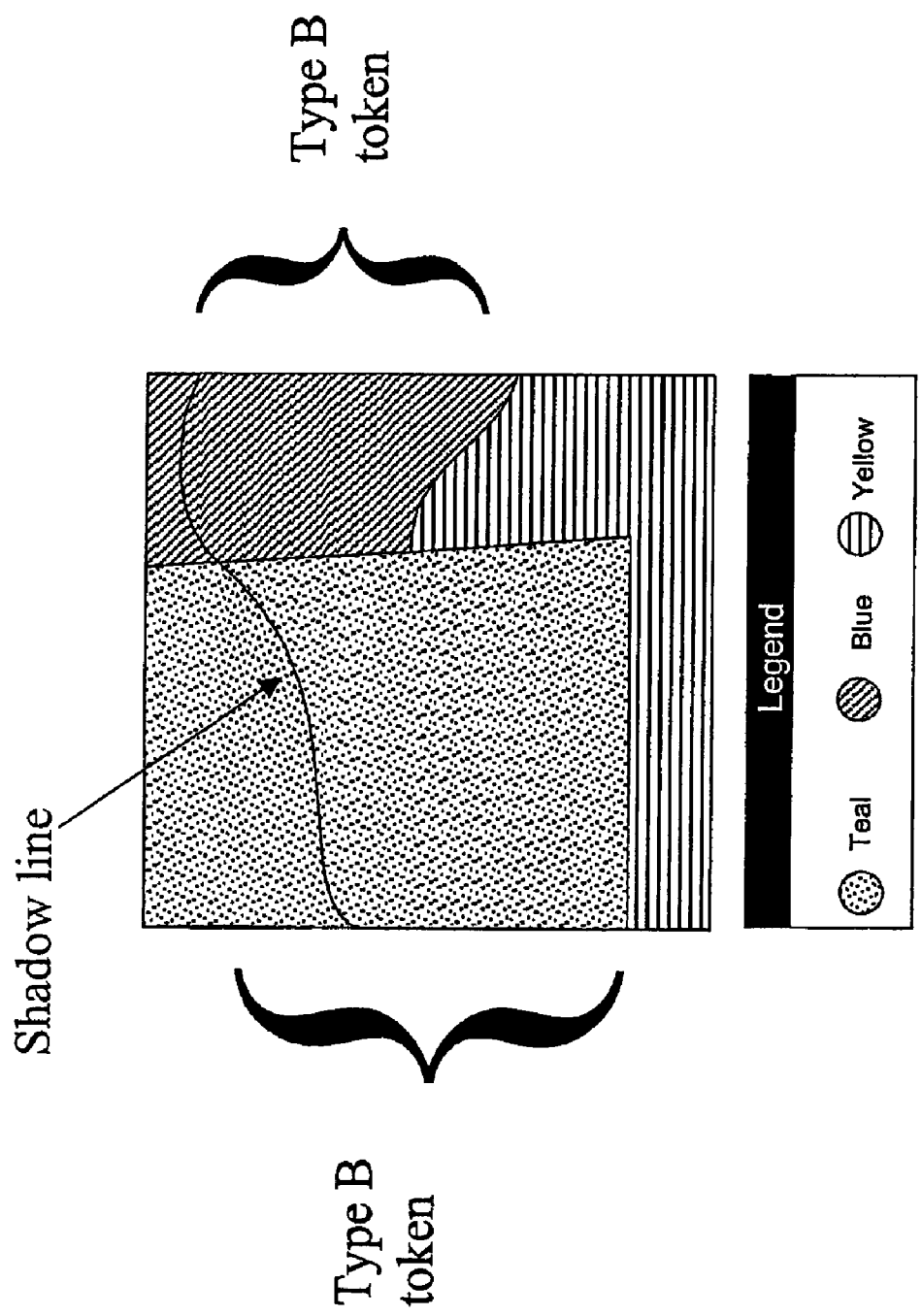
Figure 3D: Type B Tokens $$\begin{bmatrix} 0.00031426 & 0.002632078 & 0.008579021 & 0.012376362 & 0.008579021 & 0.002632078 & 0.00031426 \\ 0.002632078 & 0.017490147 & 0.039192701 & 0.043078559 & 0.039192701 & 0.017490147 & 0.002632078 \\ 0.008579021 & 0.039192701 & 0 & -0.096532354 & 0 & 0.039192701 & 0.008579021 \\ 0.012376362 & 0.043078559 & -0.096532354 & -0.318309892 & -0.096532354 & 0.043078559 & 0.012376362 \\ 0.008579021 & 0.039192701 & 0 & -0.096532354 & 0 & 0.039192701 & 0.008579021 \\ 0.002632078 & 0.017490147 & 0.039192701 & 0.043078559 & 0.039192701 & 0.017490147 & 0.002632078 \\ 0.00031426 & 0.002632078 & 0.008579021 & 0.012376362 & 0.008579021 & 0.002632078 & 0.00031426 \end{bmatrix}$$

Figure 10B

| | | | | | | |
|---|---|---|---|---|---|---|
| P(1,1) | P(1,2) | P(1,3) | P(1,4) | P(1,5) | P(1,6) | P(1,7) |
| P(2,1) | P(2,2) | P(2,3) | P(2,4) | P(2,5) | P(2,6) | P(2,7) |
| P(3,1) | P(3,2) | P(3,3) | P(3,4) | P(3,5) | P(3,6) | P(3,7) |
| P(4,1) | P(4,2) | P(4,3) | P(4,4) | P(4,5) | P(4,6) | P(4,7) |
| P(5,1) | P(5,2) | P(5,3) | P(5,4) | P(5,5) | P(5,6) | P(5,7) |
| P(6,1) | P(6,2) | P(6,3) | P(6,4) | P(6,5) | P(6,6) | P(6,7) |
| P(7,1) | P(7,2) | P(7,3) | P(7,4) | P(7,5) | P(7,6) | P(7,7) |

Fig. 10C

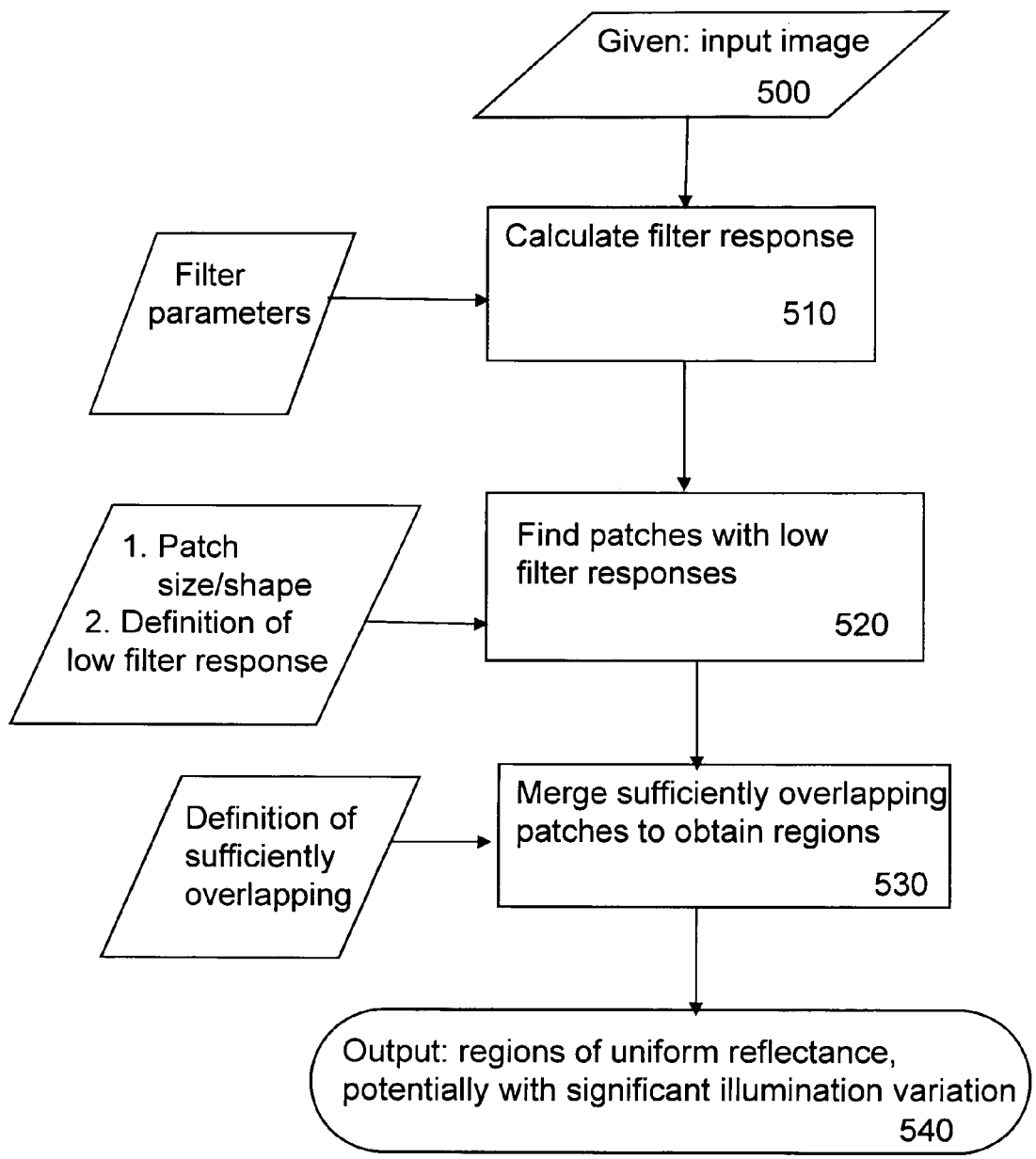
Figure 11: Generalized Identification of Regions of Uniform Reflectance

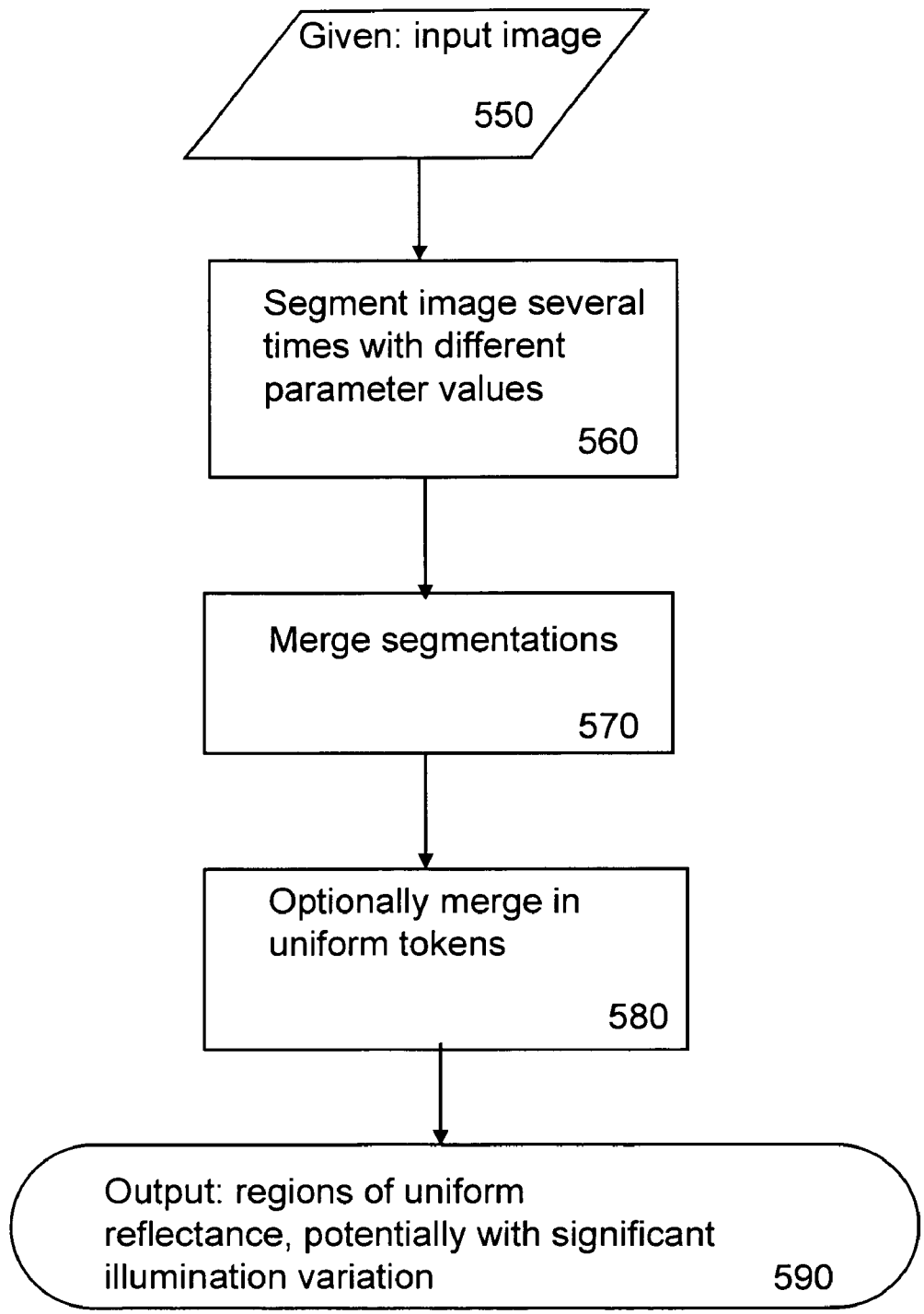
Figure 12: Combining Results

SYSTEM AND METHOD FOR IDENTIFYING COMPLEX TOKENS IN AN IMAGE

BACKGROUND OF THE INVENTION

A challenge in the utilization of computers to accurately and correctly perform operations relating to images is the development of algorithms that truly reflect and represent physical phenomena occurring in the visual world. For example, the ability of a computer to correctly and accurately distinguish between a shadow and a material object edge within an image has been a persistent challenge to scientists. An early and conventional approach to object edge detection involves an analysis of brightness boundaries in an image. In the analysis it is assumed that a boundary caused by a material object will be sharp, while a boundary caused by a shadow will be soft or gradual due to the penumbra effect of shadows. While this approach can be implemented by algorithms that can be accurately executed by a computer, the results will often be incorrect. In the real world there are many instances wherein shadows form sharp boundaries, and conversely, material object edges form soft boundaries. Thus, when utilizing conventional techniques for shadow and object edge recognition, there are significant possibilities for false positives and false negatives for shadow recognition. That is, for example, a material edge that imitates a shadow and is thus identified incorrectly by a computer as a shadow or a sharp shadow boundary that is incorrectly interpreted as an object boundary. Accordingly, there is a persistent need for the development of accurate and correct techniques that can be utilized in the operation of computers relating to images, to, for example, identify material characteristics of the image.

SUMMARY OF THE INVENTION

The present invention provides a method and system comprising image techniques that accurately and correctly identify regions of an image that correspond to a single material in a scene depicted in the image.

In a first exemplary embodiment of the present invention, an automated, computerized method is provided for processing an image. According to a feature of the present invention, the method comprises the step of performing a filter response technique to identify patches of uniform material reflectance within the image. In a preferred embodiment, the method includes the additional step of utilizing the patches of uniform material reflectance to generate single material token regions for use in processing material and illumination aspects of the image.

In a second exemplary embodiment of the present invention, a computer system is provided. The computer system comprises a CPU and a memory storing an image file. Pursuant to a feature of the present invention, the CPU is arranged and configured to execute a routine to perform a filter response technique to identify patches of uniform material reflectance within an image depicted in the image file.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The automated, computerized methods can be performed by a digital computer, analog computer, optical sensor, state machine, sequencer or any device or apparatus that can be designed or programmed to carry out the steps of the methods of the present invention.

BRIEF DESCRIPTION OF THE DRAWINGS

FIG. 1 is a block diagram of a computer system arranged and configured to perform operations related to images.

FIG. 2 shows an n×m pixel array image file for an image stored in the computer system of FIG. 1.

FIG. 3a is a flow chart for identifying Type C token regions in the image file of FIG. 2, according to a feature of the present invention.

FIG. 3b is an original image used as an example in the identification of Type C tokens.

FIG. 3c shows Type C token regions in the image of FIG. 3b.

FIG. 3d shows Type B tokens, generated from the Type C tokens of FIG. 3c, according to a feature of the present invention.

FIG. 10b is an example of an LoG filter mask.

FIG. 10c is an illustration of a 7×7 pixel patch within the n×m pixel array image file of FIG. 2.

FIG. 11 is a flow chart for identifying regions of uniform material reflectance within the n×m pixel array image file of FIG. 2, according to a feature of the present invention.

FIG. 12 is a flow chart for combining results from executions of the routine of FIG. 11 with differing parameters, according to a feature of the present invention.

DETAILED DESCRIPTION OF THE PREFERRED EMBODIMENTS

Figure 4:
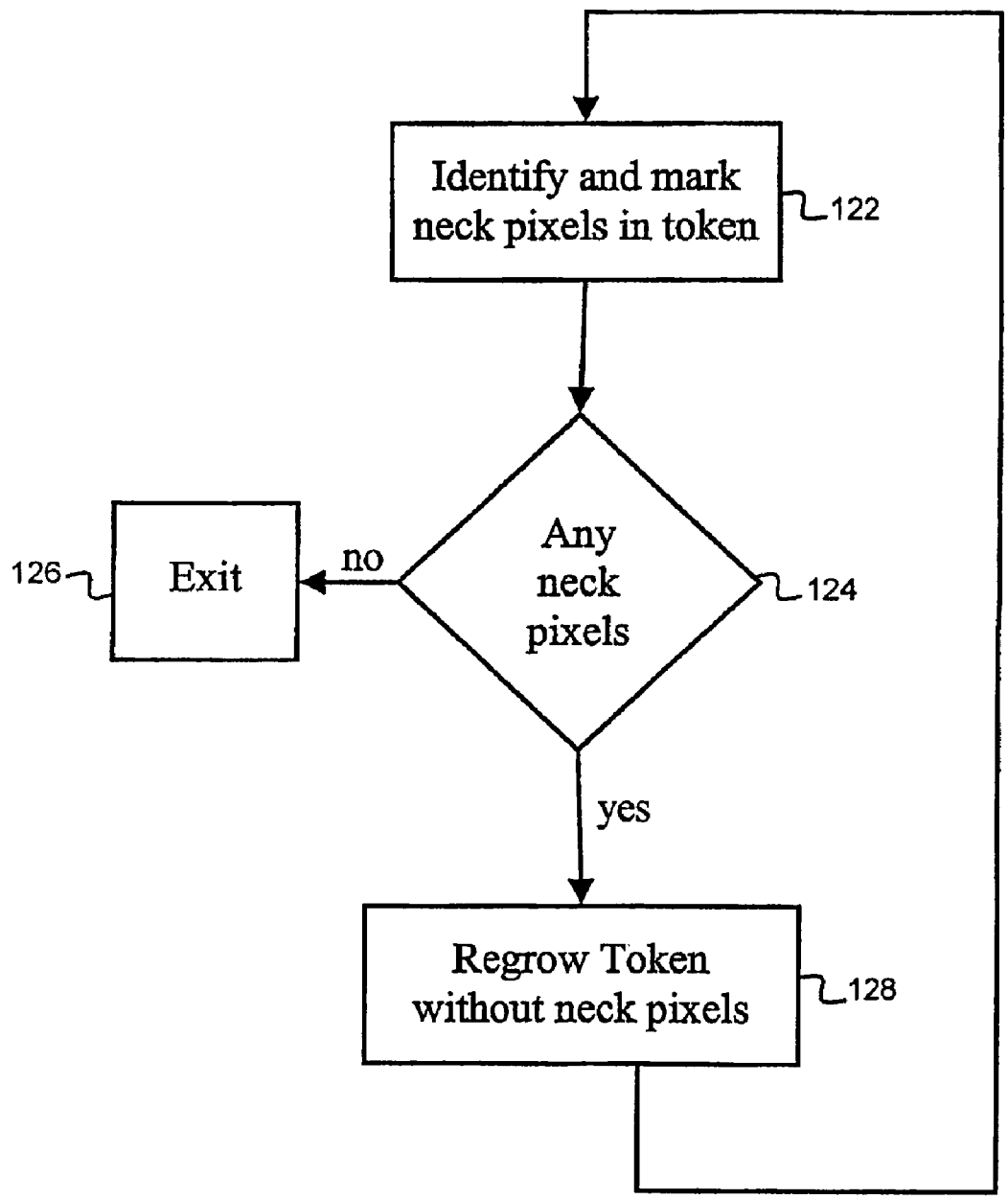
FIG. 4 is a flow chart for a routine to test Type C tokens identified by the routine of the flow chart of FIG. 3a, according to a feature of the present invention.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The pixel array includes n rows of m columns each, starting with the pixel p(1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the RGB values of the pixels of a stored image file 18 to achieve various objectives, such as, for example, to identify regions of an image that correspond to a single material depicted in a scene recorded in the image file 18. A fundamental observation underlying a basic discovery of the present invention, is that an image comprises two components, material and illumination. All changes in an image are caused by one or the other of these components. A method for detecting of one of these components, for example, material, provides a mechanism for distinguishing material or object geometry, such as object edges, from illumination and shadow boundaries.

Pursuant to a feature of the present invention, a token is a connected region of an image wherein the pixels of the region are related to one another in a manner relevant to identification of image features and characteristics such as identification of materials and illumination. The pixels of a token can be related in terms of either homogeneous factors, such as, for example, close correlation of color among the pixels, or inhomogeneous factors, such as, for example, differing color values related geometrically in a color space such as RGB space, commonly referred to as a texture. Exemplary embodiments of the present invention provide methods and systems to identify various types of homogeneous or inhomogeneous tokens for improved processing of image files. The present invention utilizes spatio-spectral information relevant to contiguous pixels of an image depicted in an image file 18 to identify token regions. The spatio-spectral information includes spectral relationships among contiguous pixels, in terms of color bands, for example the RGB values of the pixels, and the spatial extent of the pixel spectral characteristics relevant to a single material.

According to one exemplary embodiment of the present invention, tokens are each classified as either a Type A token, a Type B token or a Type C token. A Type A token is a connected image region comprising contiguous pixels that represent the largest possible region of the image encompassing a single material in the scene. A Type B token is a connected image region comprising contiguous pixels that represent a region of the image encompassing a single material in the scene, though not necessarily the maximal region corresponding to that material. A Type C token comprises a connected image region of similar image properties among the contiguous pixels of the token, where similarity is defined with respect to a noise model for the imaging system used to record the image.

Referring now to FIG. 3a, there is shown a flow chart for identifying Type C token regions in the scene depicted in the image file 18 of FIG. 2, according to a feature of the present invention. Type C tokens can be readily identified in an image, utilizing the steps of FIG. 3a, and then analyzed and processed to construct Type B tokens.

Prior to execution of the routine of FIG. 3a, the CPU 12 can operate to filter the image depicted in a subject image file 18. The filters may include a texture filter, to, for example, transform patterns of differing reflectance caused by a textured material into a homogeneous representation that captures the spectral and spatial characteristics of the textured region. Identification of tokens can be difficult in a textured image. A textured image contains materials with, for example, more than one reflectance function that manifests as a defining characteristic. For example, the defining characteristic can be a pattern of colors within the texture, such that the texture displays a certain distribution of colors in any patch or region selected from anywhere within the textured region of the image.

Other textures can be defined by geometric characteristics, such as stripes or spots. The CPU 12 can execute a software module that implements any well known method, such as, for example, a Laws filter bank, wavelets or textons (see, for example, Randen, T. [Trygve], Husøy, J. H. [John Håkon], Filtering for Texture Classification: A Comparative Study, PAMI(21), No. 4, April 1999, pp. 291-310.), or convert a local area around each pixel to an histogram. Any method utilized will convert each pixel value of N color bands to a vector of T values representing the output of one or more functions applied to a local area around the pixel, for example, an 11×11 pixel array.

For example, an histogram representation for each pixel can be produced using the following algorithm:
Loop over all pixels p in an N-band (for example, RGB) input color image;
A) Initialize N 8-bin histograms to zero, one for each color band
B) For each pixel q within a neighborhood of p (for example, an 11×11 pixel box)
  (i) For each of the N color values Cn of q;
    (a) Increment the appropriate bins of the nth histogram;
    (b) Use interpolation so that the two bins closest to the color value get incremented proportionally;
  (ii) Concatenate the N 8-bin histogram values together into a single 8×N element vector;
  (iii) Assign the 8×N element vector to the corresponding pixel p in the output image.
After the transformation from a set of color bands to a set of filter outputs, the image is treated exactly as the original color band image with respect to identifying type C tokens.

In many instances, the texture filters may only be required on part of an input image, as much of the image may include homogeneously colored objects. Therefore, prior to application of the texture filters, it is useful to identify and mask off regions of homogeneous color. The texture filters are then only applied to areas where there appear to be textured materials. An example algorithm for identifying textured regions is as follows:
1) Execute a type C tokenization on the N-band color values (e.g. RGB), storing the token results in a region map R, where each pixel in the region map has the tokenID of the token to which it belongs.
2) Execute a median filter on the region map R (e.g. each pixel P_ij is replaced by the median token ID of a 7×7 box around P_ij). Store the result in R-median.

3) Execute a filter on the original image that calculates the standard deviation of the pixels in a box around each pixel (e.g. 7×7) for each color band. Put the result in S.
4) For each pixel in S, divide the standard deviation calculated for each color band by an estimated noise model value. An example noise model is Sn=A*maxValue+B*pixelValue, where maxValue is the maximum possible color band value, pixelValue is the intensity of a particular band, and A and B are constants experimentally determined for the imaging system (e.g. A=0.001 and B=0.06 are typical). This step converts the standard deviation into a normalized deviation for each color band. Store the results in Sn.
5) For each pixel in Sn, sum the squares of the normalized deviations for all N color bands, take the square root of the result and divide by the number of bands N to create a deviation value D_ij. Compare the resulting deviation value D_ij to a threshold (e.g. 1.0) assign a 1 to any pixel with a deviation value higher than the threshold, otherwise assign the pixel a 0. Store the results in a texture mask image T.
6) For each pixel in T, if the texture mask value T_ij=1 and the seed size of the token region with the id given in the median region map R-median_ij is less than a threshold (e.g. <4), label the pixel as a textured pixel. Otherwise, label it as a homogeneous pixel. Store the result in the texture mask Tmask.

The output of the above algorithm is a mask, Tmask, which is the size of the original image. Pixels of Tmask with a 1 value should be treated as part of an image region corresponding to texture materials and pixels with a value of 0 should be treated as part of an image region corresponding to materials of homogeneous color.

A $1^{st}$ order uniform, homogeneous Type C token comprises a single robust color measurement among contiguous pixels of the image. At the start of the identification routine, the CPU 12 sets up a region map in memory. In step 100, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, N=$N_{start}$. $N_{start}$ can be any integer >0, for example it can be set at set at 11 or 15 pixels.

At step 102, a seed test is begun. The CPU 12 selects a first pixel, i=(1, 1) for example (see FIG. 2), the pixel at the upper left corner of a first N×N sample of the image file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array. The color values comparison can be with respect to multiple color band values (RGB in our example) of the pixel or the filter output representation of the pixel, in the event the image was filtered, as described above. If the comparison does not result in approximately equal values (within the noise levels of the recording device) for the pixels in the seed, the CPU 12 increments the value of i (step 106), for example, i=(1, 2), for a next N×N seed sample, and then tests to determine if i=$i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, $i_{max}$ can be set at i=(n, m). In this manner, the routine of FIG. 3a parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good" neighbors around the subject pixel, that is neighbors approximately equal in color value to the subject pixel, with the current region ID. All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token.

When the queue is empty, the CPU 12 proceeds to step 120. At step 120, the CPU 12 increments the region ID for use with identification of a next token. The CPU 12 then returns to step 106 to repeat the routine in respect of the new current token region.

Upon arrival at N=$N_{stop}$, step 110 of the flow chart of FIG. 3a, or completion of a region map that coincides with the image, the routine will have completed the token building task. FIG. 3b is an original image used as an example in the identification of tokens. The image shows areas of the color blue and the blue in shadow, and of the color teal and the teal in shadow. FIG. 3c shows token regions corresponding to the region map, for example, as identified through execution of the routine of FIG. 3a (Type C tokens), in respect to the image of FIG. 3b. The token regions are color coded to illustrate the token makeup of the image of FIG. 3b, including penumbra regions between the full color blue and teal areas of the image and the shadow of the colored areas.

While each Type C token comprises a region of the image having a single robust color measurement among contiguous pixels of the image, the token may grow across material boundaries. Typically, different materials connect together in one Type C token via a neck region often located on shadow boundaries or in areas with varying illumination crossing different materials with similar hue but different intensities. A neck pixel can be identified by examining characteristics of adjacent pixels. When a pixel has two contiguous pixels on opposite sides that are not within the corresponding token, and two contiguous pixels on opposite sides that are within the corresponding token, the pixel is defined as a neck pixel.

FIG. 4 shows a flow chart for a neck test for Type C tokens. In step 122, the CPU 12 examines each pixel of an identified token to determine whether any of the pixels under examination forms a neck. The routine of FIG. 4 can be executed as a subroutine directly after a particular token is identified during execution of the routine of FIG. 3a. All pixels identified as a neck are marked as "ungrowable." In decision block 124, the CPU 12 determines if any of the pixels were marked.

If no, the CPU 12 exits the routine of FIG. 4 and returns to the routine of FIG. 3a (step 126).

If yes, the CPU 12 proceeds to step 128 and operates to regrow the token from a seed location selected from among the unmarked pixels of the current token, as per the routine of FIG. 3a, without changing the counts for seed size and region ID. During the regrowth process, the CPU 12 does not include any pixel previously marked as ungrowable. After the token is regrown, the previously marked pixels are unmarked so that other tokens may grow into them.

Subsequent to the regrowth of the token without the previously marked pixels, the CPU 12 returns to step 122 to test the newly regrown token.

Neck testing identifies Type C tokens that cross material boundaries, and regrows the identified tokens to provide single material Type C tokens suitable for use in creating Type B tokens. FIG. 3d shows Type B tokens generated from the Type C tokens of FIG. 3c, according to a feature of the present invention. The present invention provides several exemplary techniques of pixel characteristic analysis for constructing Type B tokens from Type C tokens. One exemplary technique involves arbitrary boundary removal. The arbitrary boundary removal technique can be applied to Type C tokens whether they were generated using N color band values (RGB in our example) of the pixel or the filter output representation of the pixel, in the event the image was filtered. Actual boundaries of any particular Type C token will be a function of the seed location used to generate the token, and are thus, to some extent arbitrary. There are typically many potential seed locations for each particular token, with each potential seed location generating a token with slightly different boundaries and spatial extent because of differences among the color values of the pixels of the various seeds, within the noise ranges of the recording equipment.

Figure 5:
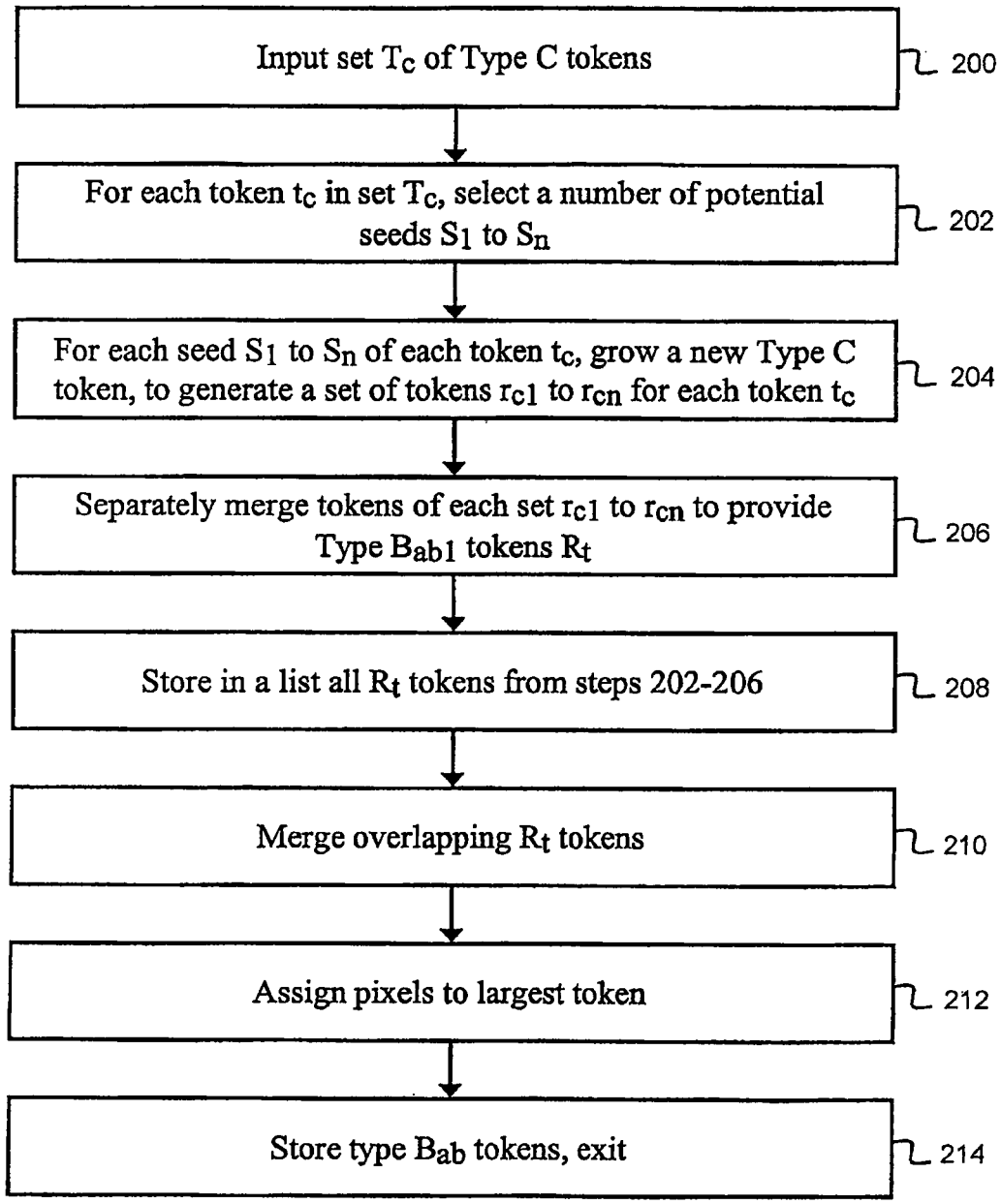
FIG. 5 is a flow chart for constructing Type B tokens via an arbitrary boundary removal technique, according to a feature of the present invention.

FIG. 5 is a flow chart for constructing Type B tokens via an arbitrary boundary removal technique, according to a feature of the present invention. In step 200, the CPU 12 is provided with a set ($T_c$) of Type C tokens generated with a seed size (S) via the routine of FIG. 3a, with neck removal via the routine of FIG. 4. The seed size $S=S_{max}$, for example, S=4 pixels. In step 202, for each Type C token, $t_c$ in the set $T_c$ the CPU 12 selects a number (for example 50) of potential seeds $s_1$ to $s_n$. In our example, each selected seed will be a 4×4 pixel array from within the token region, the pixels of the array being of approximately equal values (within the noise levels of the recording device).

In step 204, the CPU 12 grows a new Type C token, utilizing the routines of FIGS. 3a and 4, from each seed location, $s_1$ to $s_n$ of each token $t_c$ in the set $T_c$. The newly grown tokens for each token $t_c$ are designated as tokens $r_{c1}$ to $r_{cn}$. The newly grown tokens $r_{c1}$ to $r_{cn}$ for each token $t_c$ generally overlap the original Type C token $t_c$, as well as one another.

In step 206, the CPU 12 operates to merge the newly generated tokens $r_{c1}$ to $r_{cn}$ of each token $t_c$, respectively. The result is a new token $R_t$ corresponding to each original token $t_c$ in the set $T_c$. Each new token $R_t$ encompasses all of the regions of the respective overlapping tokens $r_{c1}$ to $r_{cn}$ generated from the corresponding original token $t_c$. The unions of the regions comprising the respective merged new tokens $R_t$ are each a more extensive token than the original Type C tokens of the set. The resulting merged new tokens $R_t$ result in regions of the image file 18, each of a much broader range of variation between the pixels of the respective token $R_t$ than the original Type C token, yet the range of variation among the constituent pixels will still be relatively smooth. $R_t$ is defined as a limited form of Type B token, Type $B_{ab1}$, to indicate a token generated by the first stage (steps 200-206) of the arbitrary boundary removal technique according to a feature of the present invention.

In step 208, the CPU 12 stores each of the Type $B_{ab1}$ tokens generated in steps 202-206 from the set of tokens $T_c$, and proceeds to step 210. Type $B_{ab1}$ tokens generated via execution of steps 202-206 may overlap significantly. In step 210, the CPU 12 operates to merge the $R_t$ tokens stored in step 208 that overlap each other by a certain percentage of their respective sizes. For example, a 30% overlap is generally sufficient to provide few, if any, false positive merges that combine regions containing different materials. The new set of merged tokens still may have overlapping tokens, for example, previously overlapping tokens that had a less than 30% overlap. After all merges are complete, the CPU 12 proceeds to step 212.

In step 212, the CPU 12 identifies all pixels that are in more than one token (that is in an overlapping portion of two or more tokens). Each identified pixel is assigned to the token occupying the largest region of the image. Thus, all overlapping tokens are modified to eliminate all overlaps.

In step 214, the CPU 12 stores the final set of merged and modified tokens, now designated as Type $B_{ab2}$ tokens, and then exits the routine. As noted above, the Type $B_{ab2}$ tokens were generated from Type C tokens whether the Type C tokens were generated using N color band values (RGB in our example) of the pixel or the filter output representation of the pixel, in the event the image was filtered.

Figure 6:
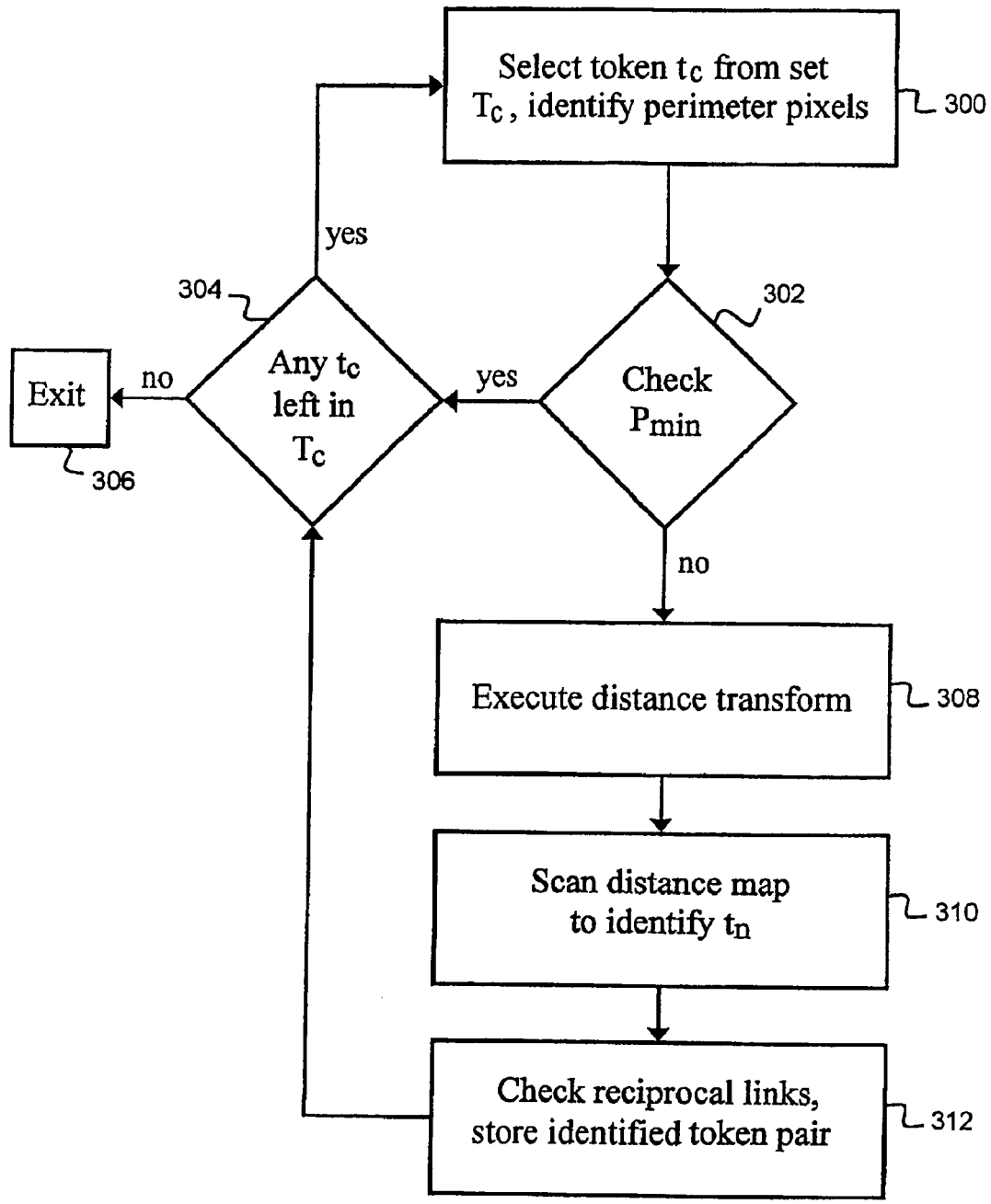
FIG. 6 is a flow chart for creating a token graph, according to a feature of the present invention.

A second exemplary technique according to the present invention, for using Type C tokens to create Type B tokens, is adjacent planar token merging. The adjacent planar token merging can be implemented when an image depicts areas of uniform color, that is for non-textured regions of an image. Initially, a token graph is used to identify tokens that are near to one another. FIG. 6 shows a flow chart for creating a token graph, according to a feature of the present invention. Each token $t_c$ in the set of Type C tokens $T_c$, generated through execution of the routines of FIGS. 3a and 4, is evaluated in terms of a maximum distance $D_{max}$ between tokens defining a neighboring pair of tokens, $t_c$, $t_n$, of the set $T_c$, a minimum number of token perimeter pixels, $P_{min}$, in each token of the neighboring pair of tokens, and a minimum fraction of perimeter pixels, $F_{min}$, of each token of a neighboring pair of tokens, required to be within $D_{max}$.

In step 300, the CPU 12 selects a Type C token $t_c$ in the set of Type C tokens $T_c$, and identifies the pixels of the selected token $t_c$ forming the perimeter of the token. In a decision block 302, the CPU 12 determines whether the number of perimeter pixels is less than $P_{min}$, for example 10 pixels.

If yes, the CPU 12 proceeds to decision block 304 to determine whether there are any remaining tokens $t_c$ in the set of Type C tokens $T_c$. If yes, the CPU 12 returns to step 300, if no, the CPU 12 exits the routine 306.

If no, the CPU 12 proceeds to step 308. In step 308, the CPU 12 generates a bounding box used as a mask to surround the selected token $t_c$. The bounding box is dimensioned to be at least $D_{max}$ larger than the selected token $t_c$ in all directions. A known distance transform (for example, as described in P. Felzenszwalb and D. Huttenlocher, Distance Transforms of Sampled Functions, Cornell Computing and Information Science Technical Report TR2004-1963, September 2004), is executed to find the distance from each perimeter pixel of the selected token $t_c$ to all the pixels in the surrounding bounding box. The output of the distance transform comprises two maps, each of the same size as the bounding box, a distance map and a closest pixel map. The distance map includes the Euclidean distance from each pixel of the bounding box to the nearest perimeter pixel of the selected token $t_c$. The closest pixel map identifies, for each pixel in the distance map, which perimeter pixel is the closest to it.

In step 310, the CPU 12 scans the distance map generated in step 308 to identify tokens corresponding to pixels of the bounding box (from the region map generated via the routine of FIG. 3a), to identify a token from among all tokens represented by pixels in the bounding box, that has a number $N_{cn}$ of pixels within the distance $D_{max}$, wherein $N_{cn}$ is greater than $P_{min}$, and greater than $F_{min}$*perimeter pixels of the respective token and the average distance between the respective token and $t_c$ is the lowest of the tokens corresponding to the pixels in the bounding box. If these conditions are satisfied, the respective token is designated $t_n$ of a possible token pair $t_c$, $t_n$, and a link $L_{cn}$ is marked active.

In step 312, the CPU 12 checks to determine whether a reciprocal link $L_{cn}$ is also marked active, and when it is marked active, the CPU 12 marks and stores in the token graph, an indication that the token pair $t_c$, $t_n$ is a neighboring token pair. The reciprocal link refers to the link status in the evaluation of the token designated as $t_n$ in the current evaluation. If that token has yet to be evaluated, the pair is not designated as a neighboring token pair until the link $L_{cn}$ is verified as active in the subsequent evaluation of the token $t_n$. The CPU 12 then returns to decision block 304 to determine whether there are any further tokens in the set $T_c$.

Figure 7:
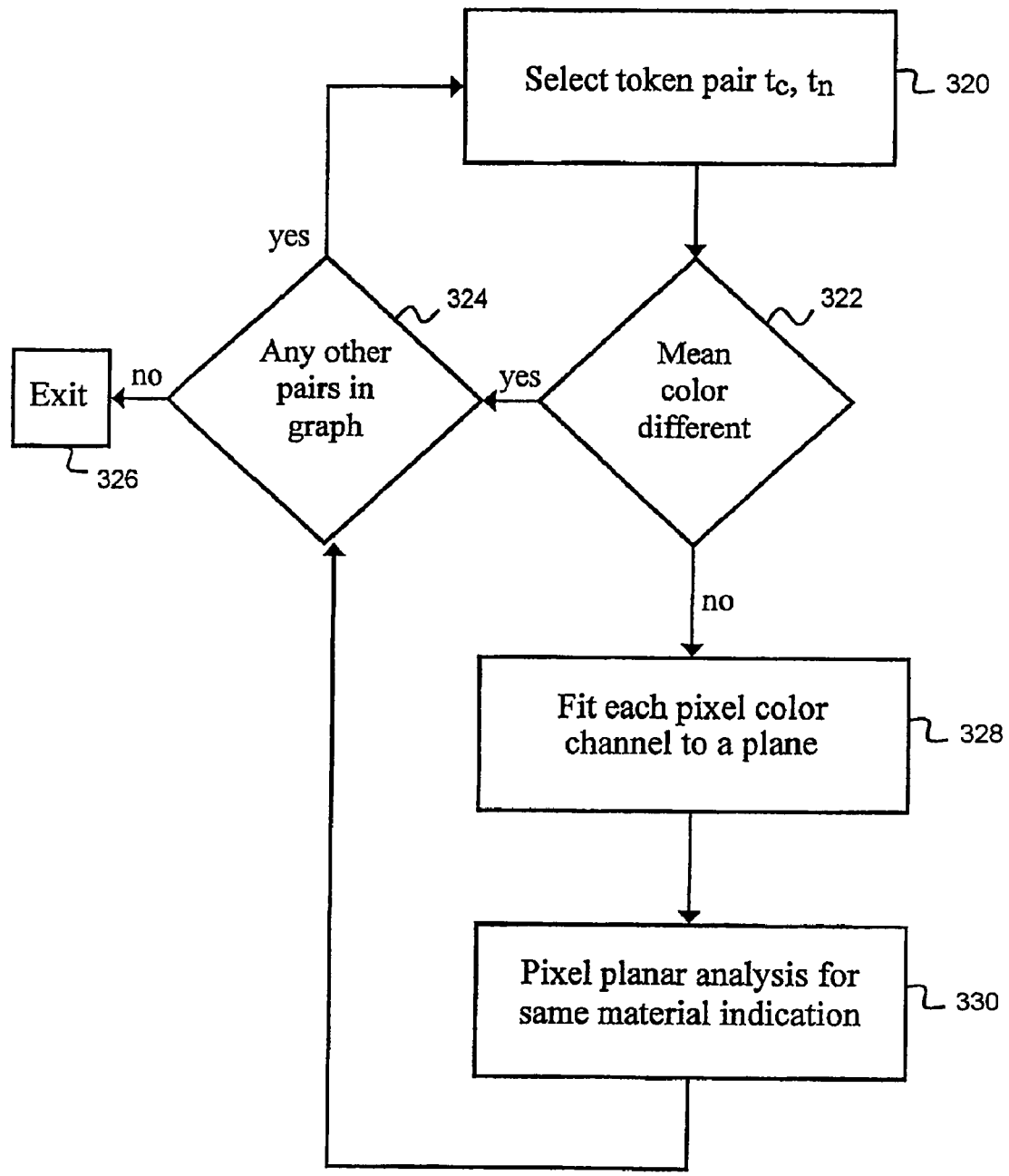
FIG. 7 is a flow chart for constructing Type B tokens via an adjacent planar token merging technique, according to a feature of the present invention.

Upon completion of the token graph, the CPU 12 utilizes token pair information stored in the graph in the execution of the routine of FIG. 7. FIG. 7 shows a flow chart for constructing Type B tokens via the adjacent planar token merging technique, according to a feature of the present invention. In the adjacent planer merging technique, pairs of tokens are examined to determine whether there is a smooth and coherent change in color values, in a two dimensional measure, between the tokens of the pair. The color change is examined in terms of a planar representation of each channel of the color, for example the RGB components of the pixels according to the exemplary embodiments of the present invention. A smooth change is defined as the condition when a set of planes (one plane per color component) is a good fit for the pixel values of two neighboring tokens. In summary, neighboring tokens are considered the same material and a Type B token when the color change in a two-dimensional sense is approximately planar.

In step 320, the CPU 12 selects a token pair $t_c$, $t_n$ from the token graph. In decision block 322, the CPU 12 determines whether the mean color in token $t_c$ is significantly different from the mean color in the token $t_c$. The difference can be a function of a z-score, a known statistical measurement (see, for example, Abdi, H. (2007), Z-scores, in N. J. Salkind (Ed.), Encyclopedia of Measurement and Statistics, Thousand Oaks, Calif.: Sage), for example, a z-score greater than 3.0.

If the mean colors of the token pair are different, the CPU 12 proceeds to decision block 324 to determine whether there are any additional token pairs in the token graph. If yes, the CPU 12 returns to step 320. If no, the CPU 12 exits the routine (step 326).

If the mean colors are within the z-score parameter, the CPU 12 proceeds to step 328. In step 328, the CPU 12 performs a mathematical operation such as, for example, a least median of squares regression (see, for example, Peter J. Rousseeuw, Least Median of Squares Regression, Journal of the American Statistical Association, Vol. 79, No. 388 (December, 1984), pp. 871-880) to fit a plane to each color channel of the pixels (in our example RGB) of the token pair $t_c$, $t_n$, as a function of row n and column m (see FIG. 2), the planes being defined by the equations:

$$R=X_{Rn}+Y_{Rm}+Z_R \ G=X_{Gn}+Y_{Gm}+Z_G \ B=X_{Bn}+Y_{Bm}+Z_B$$

wherein parameter values X, Y and C are determined by the least median of squares regression operation of the CPU 12.

Upon completion of the plane fitting operation, the CPU 12 proceeds to step 330. In step 330, the CPU 12 examines each pixel of each of the tokens of the token pair $t_c$, $t_n$ to calculate the z-score between each pixel of the tokens and the planar fit expressed by the equation of the least median of squares regression operation. When at least a threshold percentage of the pixels of each token of the pair (for example, 80%), are within a maximum z-score (for example, 0.75), then the neighboring token pair is marked in the token graph as indicating the same material in the image. After completion of step 330, the CPU 12 returns to decision block 324.

Upon exiting the routine of FIG. 7, the CPU 12 examines the token graph for all token pairs indicating the same material. The CPU 12 can achieve the examination through performance of a known technique such as, for example, a union find algorithm. (See, for example, Zvi Galil and Giuseppe F. Italiano. Data structures and algorithms for disjoint set union problems, ACM Computing Surveys, Volume 23, Issue 3 (September 1991), pages 319-344). As a simple example, assume a set of seven Type C tokens $T_1, T_2, T_3, T_4, T_5, T_6, T_7$. Assume that the result of the execution of FIG. 7, (performance of the adjacent planar analysis), indicates that tokens $T_1$ and $T_2$ are marked as the same material, and tokens $T_1$ and $T_3$ are also marked as the same material. Moreover, the results further indicate that tokens $T_4$ and $T_5$ are marked as the same material, and tokens $T_5$ and $T_6$ are also marked as the same material. The result of execution of the union find algorithm would therefore indicate that tokens $\{T_1, T_2, T_3\}$ form a first group within the image consisting of a single material, tokens $\{T_4, T_5, T_6\}$ form a second group within the image consisting of a single material, and token $\{T_7\}$ forms a third group within the image consisting of a single material. The groups $\{T_1, T_2, T_3\}$, $\{T_4, T_5, T_6\}$ and $\{T_7\}$ form three Type B tokens.

Figure 8:
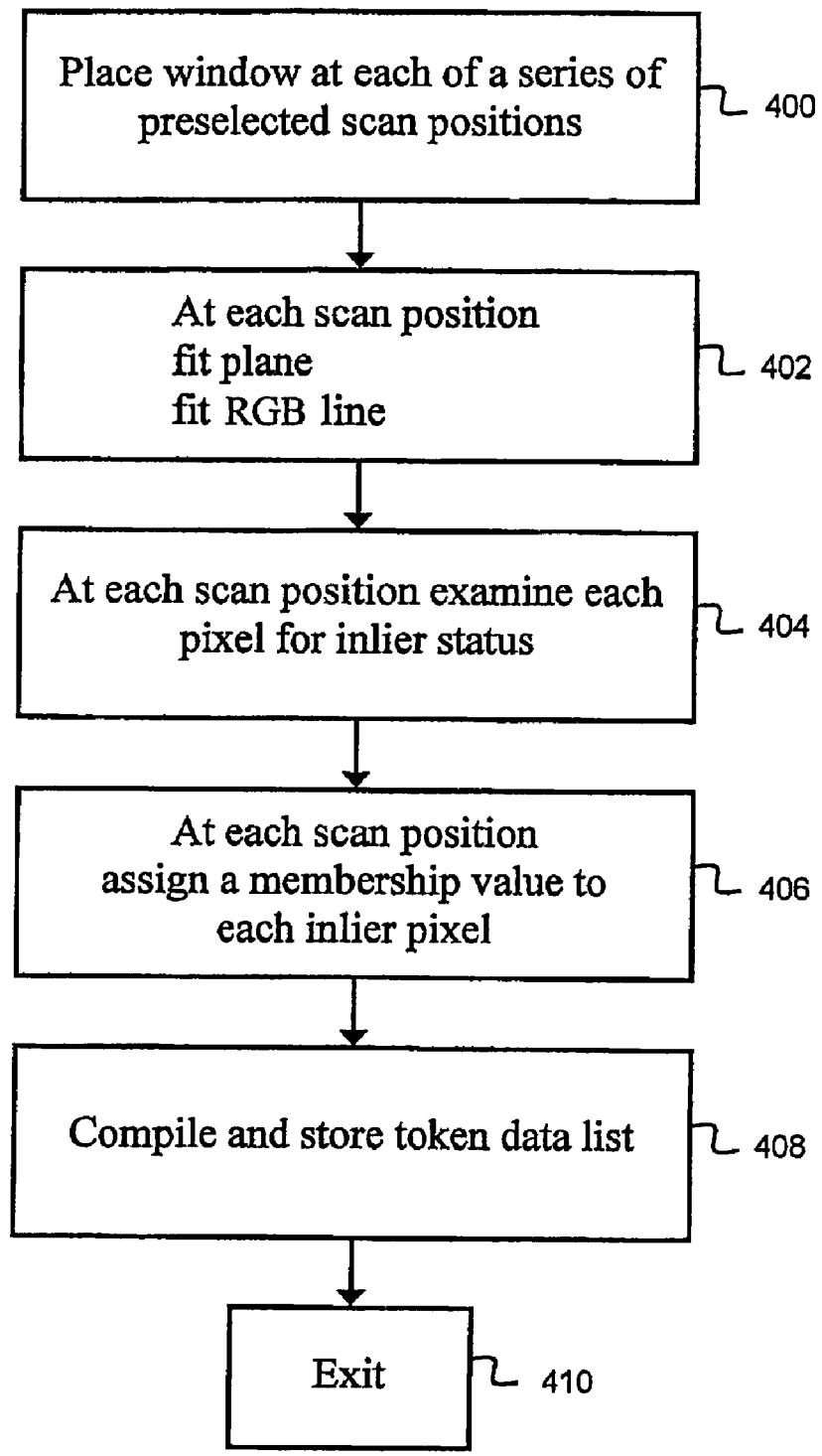
FIG. 8 is a flow chart for generating Type C tokens via a local token analysis technique, according to a feature of the present invention.

A third exemplary technique according to the present invention, for using Type C tokens to create Type B tokens, is a local token analysis. A local token approach generates Type C tokens using a window analysis of a scene depicted in an image file 18. Such tokens are designated as Type $C_w$ tokens. FIG. 8 is a flow chart for generating Type $C_w$ tokens via the local token analysis technique, according to a feature of the present invention.

In step 400, the CPU 12 places a window of fixed size, for example, a 33×33 pixel array mask, over a preselected series of scan positions over the image. The window can be a shape other than a square. The scan positions are offset from one another by a fixed amount, for example ½ window size, and are arranged, in total, to fully cover the image. The window area of pixels at each scan position generates a Type $C_w$ token, though not every pixel within the window at the respective scan position is in the Type $C_w$ token generated at the respective scan position.

At each scan position (step 402), the CPU 12 operates, as a function of the pixels within the window, to fit each of a set of planes, one corresponding to the intensity of each color channel (for example, RGB), and an RGB line in RGB space, characterized by a start point $I_0$ and an end point $I_1$ of the colors within the window. The planar fit provides a spatial representation of the pixel intensity within the window, and the line fit provides a spectral representation of the pixels within the window.

For the planar fit, the planes are defined by the equations:

$$R=X_{Rn}+Y_{Rm}+Z_R \ G=X_{Gn}+Y_{Gm}+Z_G \ B=X_{Bn}+Y_{Bm}+Z_B$$

wherein parameter values X, Y and C are determined by CPU 12 by executing a mathematical operation such as the least median of squares regression discussed above, a least-squares estimator, such as singular value decomposition, or a robust estimator such as RANSAC (see, for example, M. A. Fischler, R. C. Bolles. Random Sample Consensus: A Paradigm for Model Fitting with Applications to Image Analysis and Automated Cartography. Comm. of the ACM, Vol 24, pp 381-395, 1981).

For the RGB line fit, the line is defined by: $I(r,g,b)=I_0(r,g,b)+t(I_1(r,g,b)-I_0(r,g,b))$ wherein the parameter t has a value between 0 and 1, and can be determined by the CPU 12 utilizing any of the mathematical techniques used to find the planar fit.

At each scan position, after completion of step 402, the CPU 12 operates in step 404 to examine each pixel in the window in respect of each of the planar fit representation and RGB line representation corresponding to the respective window scan position. For each pixel, the CPU 12 determines an error factor for the pixel relative to each of the established planes and RGB line. The error factor is related to the absolute distance of the pixel to its projection on either from either the planar fit or the RGB line fit. The error factor can be a function of the noise present in the recording equipment or be a percentage of the maximum RGB value within the window, for example 1%. Any pixel distance within the error factor relative to either the spatial planar fit or the spectral line fit is labeled an inlier for the Type $C_w$ token being generated at the respective scan position. The CPU 12 also records for the Type $C_w$ token being generated at the respective scan position, a list of all inlier pixels.

At each scan position, after completion of step 404, the CPU 12 operates in step 406 to assign a membership value to each inlier pixel in the window. The membership value can be based upon the distance of the inlier pixel from either the planar fit or the RGB line fit. In one exemplary embodiment of the present invention, the membership value is the inverse of the distance used to determine inlier status for the pixel. In a second exemplary embodiment, a zero-centered Gaussian distribution with a standard deviation is executed to calculate membership values for the inlier pixels.

After all of the scan positions are processed to generate the Type $C_w$ tokens, one per scan position, the CPU 12 operates to compile and store a token data list (step 408). The token data list contains two lists. A first list lists all of the pixels in the image file 18, and for each pixel, an indication of each Type $C_w$ token to which it labeled as an inlier pixel, and the corresponding membership value. A second list lists all of the generated Type $C_w$ tokens, and for each token an indication of the inlier pixels of the respective token, and the corresponding membership value. After compiling and storing the token data list, the CPU 12 exits the routine (step 410).

Figure 9:
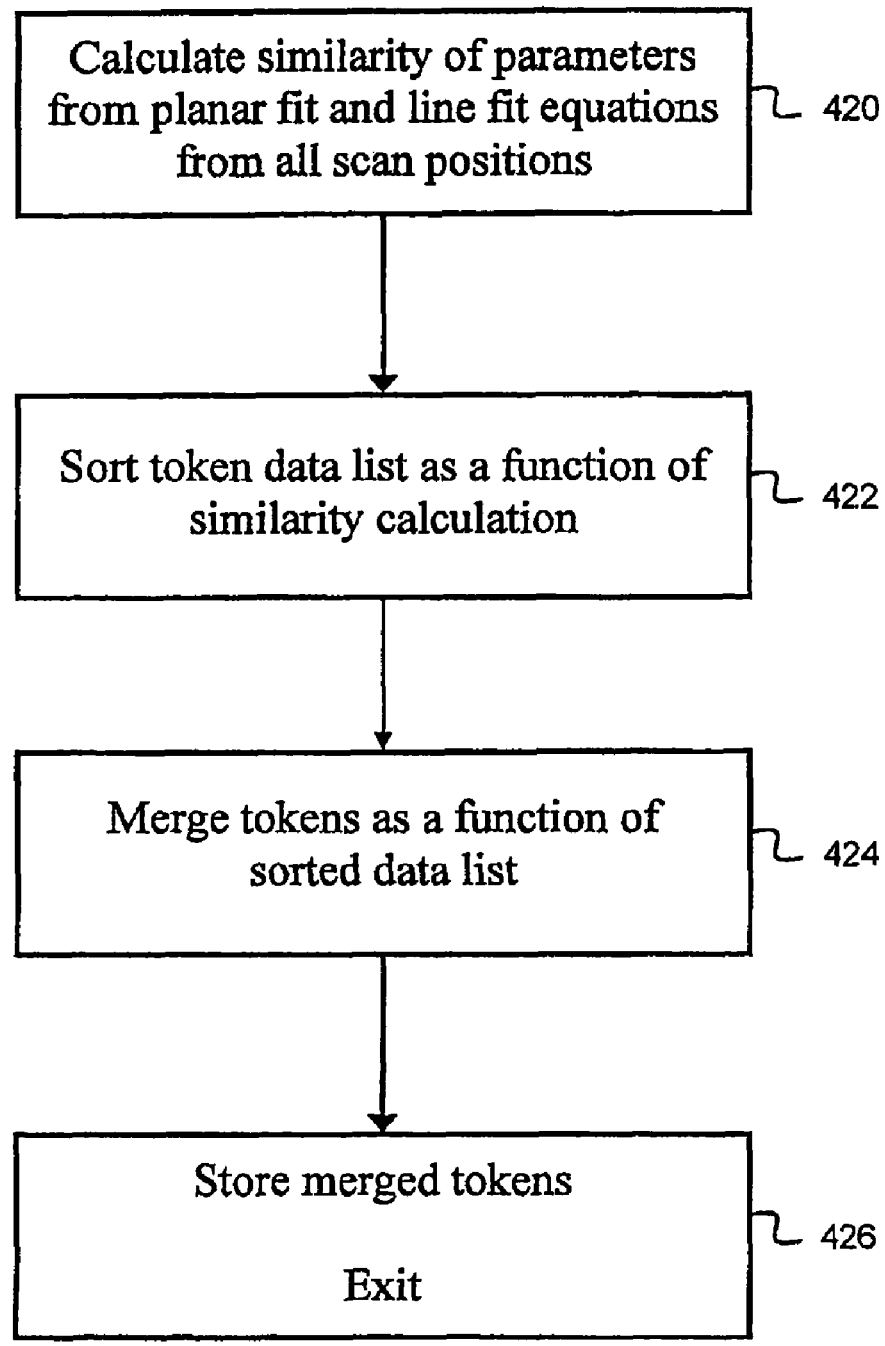
FIG. 9 is a flow chart for constructing Type B tokens from Type C tokens generated via the local token analysis technique of FIG. 8, according to a feature of the present invention.

FIG. 9 is a flow chart for constructing Type B tokens from the Type $C_w$ tokens generated via the local token analysis technique, according to a feature of the present invention. In step 420, the CPU 12 calculates a similarity of parameters of the spatial planer dimensions and spectral RGB lines of adjacent or overlapping Type $C_w$ tokens generated through execution of the routine of FIG. 8. Overlapping and adjacent Type $C_w$ tokens can be defined as tokens corresponding to scan positions that overlap or are contiguous. A similarity threshold can be set as a percentage of difference between each of the spatial planer dimensions and spectral RGB lines of two overlapping or adjacent Type $C_w$ tokens being compared. The percentage can be a function of the noise of, for example, the camera 14 used to record the scene of the image file 18. All overlapping or adjacent Type $C_w$ token pairs having a calculated similarity within the similarity threshold are placed on a list.

In step 422, the CPU 12 sorts the list of overlapping or adjacent Type $C_w$ token pairs having a calculated similarity within the similarity threshold, in the order of most similar to least similar pairs. In step 424, the CPU 12 merges similar token pairs, in the order of the sort, and labeling pairs as per degree of similarity. Each merged token pair will be considered a Type B token. In step 426, the CPU 12 stores the list of Type B tokens, and exits the routine.

In a further exemplary technique according to the present invention, a filter response, such as, for example, a second derivative filter response, is executed by the CPU 12 to identify regions of an image having uniform material reflectance. The identified regions are then used to generate Type B tokens. A filter response can be implemented by performing a convolution of pixel values. Convolution is a mathematical technique that applies a filter mask to an array of pixels to determine a function response value for a pixel at the center of the array. The filter mask represents a mathematical function such as, for example, a Laplacian of Gaussian kernel (LoG). The LoG filter is a known filter used to determine a mathematical function output value at each pixel location of an image, an output value that is related to a derivative value at the respective pixel location, and utilized to detect material edges in an image.

Figure 10A:
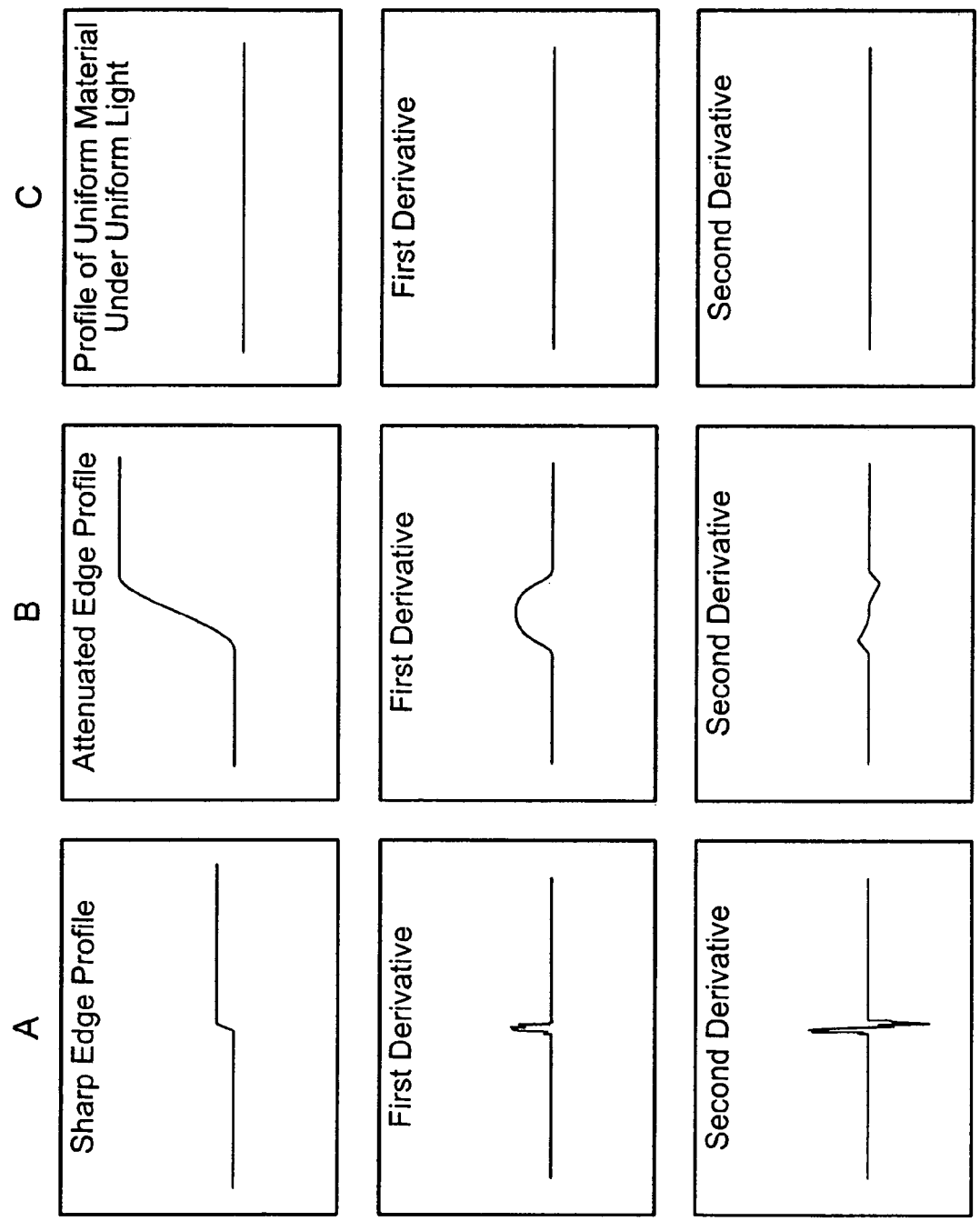
FIG. 10a shows intensity profiles and corresponding first derivative and second derivative profiles for each of a material edge, a single material with a shadow over a portion of the material and a single material under constant illumination.

FIG. 10a shows intensity profiles within an image, and corresponding first derivative and second derivative profiles for each of a material edge, a single material with a shadow over a portion of the material and a single material under constant illumination. A derivative is a measure of a rate of change. In an image, a first derivative measures the rate of change in the intensity of a color band, for example, the rate of change of red, from pixel to pixel of the image. A second derivative is a measure of the rate of change of the rate of change, i.e., a measure of the rate of change of the first derivative. The A column of FIG. 10a shows the intensity profile, and first and second derivative profiles at a material edge within an image. As shown in column A, the color intensity profile forms a sharp edge profile at a material boundary, resulting in a spike in the first derivative value reflecting the sharp rate of change of material intensity at the material boundary. Consequently, the second derivative value undergoes a zero crossing, first peaking in the positive direction as the first derivative peaks at the boundary, and then crossing zero and peaking in the negative direction as the first derivative peak returns to zero.

In the known LoG filter technique, high first derivative values, first derivative peaks or second derivative zero crossings among pixels, are utilized as indicia of a material edge, as reflected in column A of FIG. 10a. In contrast to the first derivative peaks and second derivative zero crossings of a material edge, columns B and C of FIG. 10a show, respectively, intensity profiles and corresponding first derivative and second derivative profiles for each of a single material with a shadow over a portion of the material and a single material under constant illumination. In column B, the intensity of the image undergoes an attenuated edge, corresponding to the penumbra of a shadow falling across pixels representing a single material. Thus, the first derivative slowly raises and falls with the attenuated change of a penumbra, and the second derivative remains at a relatively low value throughout the slow rise and fall of the first derivative remains at a relatively low value throughout the slow rise and fall of the first derivative value. As shown in column C, a constant value for the illumination of a single material results in a constant low value among pixels for each of the first derivative and second derivative values.

According to a feature of the present invention, a second derivative filter, such as, for example, a LoG filter, is used in a novel manner, to identify regions of an image, for example, patches comprising pixels having uniformly low second derivative values, as shown in each of columns B and C of FIG. 10a. In an exemplary embodiment, each patch is of a preselected size (for example, either a 3×3 pixel array, a 5×5 pixel array or a 7×7 pixel array). As described above, a patch of uniform material reflectance under uniform light will have a near constant color value across the pixels of the patch, resulting in a low value for the second derivative at each pixel location in the patch. Additionally, a constant material reflectance in an attenuated penumbra will also result in a low value for the second derivative among pixels of a patch.

Thus, ascertaining the location of a patch of pixels, all having a low value for the second derivative, provides a high indication of likelihood that there is not a material edge within the patch, and that all of the pixels of the patch have the same material reflectance. The present invention contemplates any function response among a patch of pixels that is relevant to a likelihood of uniform material reflectance, such as, for example, second derivative values, third derivative values or other measures of the curvature of the intensity profile of the image, where the intensity profile is the shape of the image in (x, y, intensity) space.

A Laplacian filter provides a sum of partial second derivatives at a point in the image. A Laplacian filter can therefore be implemented to ascertain function outputs proportional to the second derivative values for pixels of an image. The Laplacian of an image I is defined as:

$$\nabla^2 I = \frac{\partial^2 I}{\partial x^2} + \frac{\partial^2 I}{\partial y^2}$$

The above function is the sum of the second partial derivatives in the x and y directions (along the n rows and m columns of the array of FIG. 2), and is proportional to the average second derivative across all directions.

Due to the presence of noise and small-scale variations in an image, first and second derivative analysis of an image is typically performed on a blurred version of the image. A blurred version of an image smoothes out any irregularities caused by noise and image variations, and can be obtained through any standard blurring function. For example, a convolution of the image with a filter mask based upon a Gaussian function. A Gaussian function can be defined by:

$$G_\sigma(x, y) = \frac{1}{2\pi\sigma^2} e^{-(x^2+y^2)/(2\sigma^2)}$$

The σ factor is the standard deviation and controls the degree of blurring of a convolved image. A small value for σ results in a relatively small degree of blurring, while a large value for σ results in significant blurring.

An LoG function combines the Laplacian and Gaussian functions into a single function that serves to both blur the image and ascertain the Laplacian values to provide accurate outputs proportional to the second derivative values for the pixels of an image. In place of the LoG function, a Difference of Gaussians or convolution with simple derivative masks on a blurred image can be used. An LoG function equation is as follows:

$$\nabla^2 G_\sigma(x, y) = \frac{\partial^2 G_\sigma}{\partial x^2} + \frac{\partial^2 G_\sigma}{\partial y^2} = \left(\frac{x^2+y^2-2\sigma^2}{2\sigma^6\pi}\right) e^{-(x^2+y^2)/(2\sigma^2)}$$

FIG. 10b is an example of an LoG filter mask. The mask comprises a 2k+1×2k+1 array of multiplication factors, in our example, k=3, for 7 rows of factors, each with 7 columns, thus, a length of 7 σ relative to the center, with σ=1 in the filter mask of FIG. 10b. The filter mask of FIG. 10b is arranged for use in connection with a convolution of the image via 7×7 pixel patch samples of the image file of FIG. 2. The multiplication factors express the LoG function and are applied to the pixels of the corresponding patch, and all the results are summed to provide a function response value for the pixel at the center of the 7×7 array, as will be described.

To that end, FIG. 10c shows an illustration of a representative pixel patch comprising an 7×7 array within the n×m pixel array of the image file of FIG. 2. The 7×7 patch in the example of FIG. 10b forms the upper left hand corner of the n×m pixel array of FIG. 2, and would be used to calculate a value proportional to the second derivative for the pixel p(4, 4), the center pixel of the representative array (shown in bold).

Each multiplication factor of the filter mask corresponds to a function response for a corresponding pixel of the 7×7 patch, and is used to calculate a multiplication result for the respective pixel of the patch. The multiplication factor applied to each pixel is determined in relation to the combined Laplacian and Gaussian functions set forth above, (an LoG filter mask) as is known in the art. The filter mask expresses the following summation equation:

Output $p(n,m) = \sum_{i=-k}^{k} \sum_{j=-k}^{k} p(n+i, m+j) \text{LoG}(i,j)$.

Each pixel p(n, m) is represented by N color bands, for example RGB, for the red, green and blue components of the color value for the pixel p(n, m). The multiplication factors of the filter mask will be applied separately to each color band of the pixels of the patch, resulting in a separate second derivative value for each color band. In our example, we will describe the calculation for the red band (p(n, m RED)). Thus, p(1,1 RED) is multiplied by the factor 0.00031426, while the next pixel of the row, p(1,2 RED) is multiplied by the factor 0.002632078, and so on. The pixels of each row, 1-7 are multiplied in order, across the columns, by the multiplication factors at the corresponding rows and columns of the LoG filter mask. The results of all the multiplications are added together to provide a sum that is proportional to a second derivative value for the center pixel p(4,4), as a function of the LoG function.

A similar filter response output is performed for each pixel p(n, m) of the n×m array and for each color band of each pixel, to compile a list of second derivative values for the pixels p(n, m) of an image file 18. At border regions of the image, for example, pixels within 3 pixels of the image boundary, for pixel values of points of the 7×7 patch that extend beyond the image boundary, estimates can be made for the respective color values, based upon various assumptions, as follows:
1. assume the values for pixels at the image boundary continue beyond the boundary, such that values for pixels in the patch that extend beyond the image boundary are set at the same color intensity as the color intensity of the nearest boundary pixel;
2. assume the image reflects at the boundary, for example, the values for pixels of the patch beyond the image boundary are a mirror image of corresponding pixels within the image; or
3. assume all values outside the image are a constant value, such as 0 or the maximum image value.

Second derivative values can be either positive or negative. In the exemplary embodiment of the present invention, an absolute value is used for the second derivative. Moreover, the values for each band, in our example, red, green and blue, are represented as a single number per pixel. The single number value can be obtained by taking the maximum second derivative filter response output from among the color bands of the pixel, taking an average for the filter response outputs of all the bands or, in hyperspectral imagery, taking a percentile value from each band, for example the $90^{th}$ percentile value filter output value from among the color bands.

In one embodiment of the filter response feature, second derivative values are determined in a log space version or a gamma transform of the image. When a region of an image is very dark, and, further, in deep shadow, first and second derivatives become small, and are not useful as accurate indications of regions of uniform material reflectance. The use of logarithmic values of color intensity or a gamma transform maintains an equality of color differences, regardless of the illumination flux (or image exposure) affecting the image.

FIG. 11 is a flow chart for identifying regions of uniform material reflectance within the n×m pixel array image file of FIG. 2, according to the filter response feature of the present invention. In step 500, an image file 18 (see FIG. 2) is input to the CPU 12. In step 510, the CPU 12 calculates a filter response for each of the pixels p(n, m) of the image file 18. In our exemplary embodiment of the present invention, the filter response is a value proportional to the second derivative at each pixel p(n, m) of the image file 18. Such values can be calculated by the CPU 12 via a convolution of the image file 18, by the CPU 12 with a LoG filter mask, as described above in respect of FIGS. 10b and 10c.

In order to execute the filter response step, appropriate filter parameters are input to the CPU 12. In the case of a LoG filter mask, the relevant parameter is the σ factor, which determines the degree of blurring. The σ factor can range, for example, between 0.5 and 3.0.

In step 520, the CPU 12 operates to locate patches of the pixel array with filter responses that indicate uniform material reflectance among the pixels of the patch. In the example of second derivative values, a low filter response is indicative of the absence of material edges, and thus provides a high degree of likelihood that the patch encompasses a region of the image that has a uniform material reflectance, as described above. Input parameters relevant to step 520 include patch size and shape and a definition of a low filter response. Each patch can be, for example, square, rectangular, circular, and so on. In our example, each patch can comprise a 3×3 square or circular patch with a radius of 9. The CPU 12 examines a sequence of patches across the entire image file 18, with each patch being centered on a different one of the pixels p(n, m) of the array of the subject image file 18, across all the pixels of the array.

For each patch examined, the CPU 12 determines whether the filter responses of the pixels of the patch under examination, are below a threshold value. The measure can, for example, be a threshold measured against the average filter response for the pixels of the patch or a threshold measured against the maximum second derivative value among the pixels of the patch. The threshold can be determined empirically, with lower values tending to more significant segmentation (dividing the image into too many regions) and higher values leading to errors (considering two regions to be the same material reflectance when they are not). The CPU 12 lists each examined patch of the subject image file 18 that has a result below the threshold, and therefore indicates a high likelihood of uniform material reflectance within the examined patch.

In step 530, the CPU 12 operates to merge all sufficiently overlapping patches from among patches that are on the above complied list of patches indicating a high likelihood of uniform material reflectance, to compose a list of merged patches as Type B tokens. A parameter relevant to step 530 is a definition of "sufficiently overlapping." For example, the CPU 12 merges all listed patches that have 5 pixels in common, or 10 pixels in common, and so on. Given that each patch has a high likelihood of uniform material reflectance, and the patches share a number of pixels in common, it can be concluded that the two sufficiently overlapping patches have the sufficiently overlapping patches share the same material reflectance. All listed patches that overlap to the extent that they share the selected number of pixels are merged, and the merging is cumulative for mutually overlapping patches to provide the maximum extent of regions of the image having uniform reflectance. The output (540) of the routine is a list of Type B tokens, a segmentation of the image into regions of uniform reflectance. Inasmuch as each merged region may include pixels having non-zero first derivatives, each identified Type B token may encompass significant illumination variation.

Referring now to FIG. 12, there is shown a flow chart for combining results from executions of the routine of FIG. 11 with differing parameters, according to a feature of the present invention. As noted in the description of FIG. 11, various variable parameters are input to the CPU 12. In our exemplary embodiment, the variable parameters include the σ factor, patch size and shape, a definition of a low filter response and a definition of sufficiently overlapping. Different combinations of parameters yield differing results. One set of parameters can capture some portions of an image well, with well defined Type B tokens, but leave other portions of the image in many small unconnected patches, while another set of parameters might capture different parts of the image well. Thus, by varying values within the set of parameters, and executing the routine of FIG. 11 several times, one time with each unique set of parameters, the CPU 12 can obtain several sets of segmentation results to provide a more robust overall result that is significantly improved from a result that would be obtained from any one particular set of parameters.

For example, a small patch size will localize material edges more effectively, while larger patch sizes avoid crossing gaps where edges occasionally disappear. The threshold should also be lowered as patch size and the σ factor increase, and so on. To that end, in step 550, an image file 18 is input to the CPU 12. In step 560, the CPU 12 executes the routine of FIG. 11 several times in succession, each time with a different set of input parameters.

In step 570, the CPU 12 operates to merge the results of the several segmentation operations for the subject image file 18. The merge operation can be similar to the merge step 530 of the routine of FIG. 11, for example, a merge of all identified Type B tokens that overlap by a selected number of pixels. Alternatively, the CPU 12 can implement the overlap criteria set forth below, in respect of the following description of a further exemplary embodiment of the present invention.

In step 580, the CPU 12 can optionally merge in Type C tokens identified by the CPU 12 during execution of the routine of FIG. 3a, as described above. In examining pixel patches for low second derivative values, the filter response technique inherently tends to avoid material edges, and thus, the technique provides Type B tokens that can fall short of image areas around edges. To "fill out" Type B tokens identified through the second derivative filter response technique, the CPU 12 can merge the identified Type B tokens that overlap previously identified Type C tokens. Again the overlap criteria can be as described above. In step 590, the CPU 12 outputs a list of Type B tokens.

In a further exemplary embodiment of the present invention, the CPU 12 compiles lists of Type B tokens separately generated through each of and/or a combination of one or more of the arbitrary boundary removal, adjacent planar token merging, local token analysis and filter response techniques. The determination of the combination of techniques used depends in part on whether a particular region of the image was filtered because of texturing of the image. Since each Type B token generated through the described techniques likely represents a single material under varying illumination conditions, merging sufficiently overlapping Type B tokens generated through the use of varying and different techniques, provides a resulting, merged Type B token that represents a more extensive area of the image comprising a single material, and approaches the extent of a Type A token.

Sufficiently overlapping can be defined by satisfaction of certain pixel characteristic criteria, such as, for example:
A) The two Type B tokens have at least n of the original Type C tokens in common, for example, n=1
B) The two Type B tokens have at least n pixels in common, for example, n=20
C) The two Type B tokens have at least n % overlap, that is at least n % of the pixels in a first one of the two Type B tokens are also found in the second one of the two Type B tokens or vice versa, wherein, for example n %=10%.
D) The percentage of pixels in a smaller one of the two Type B tokens, also found in the larger one of the two Type B tokens is above a preselected threshold, for example 15%.
E) A preselected combination of criteria A-D.

Merging of two sufficiently overlapping Type B tokens can be accomplished via a mathematical operation such as execution of the union find algorithm discussed above. In the case of two overlapping Type B tokens that do not satisfy the above discussed criteria, the overlapping pixels of the two tokens can be assigned to the larger one of the two Type B tokens.

As a result of execution of the token generation and merging techniques according to features of the present invention, an image can be accurately segmented into tokens representing discrete materials depicted in the scene, thus providing a basis for reduction of inaccuracies in image processing that may be caused by varying illumination conditions, for more robust computer processing of images.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
    performing a filter response technique to identify patches of uniform material reflectance within the image;
    utilizing the identified patches of uniform material reflectance to generate single material token regions, and
    listing the single material token regions to process material and illumination aspects of the image.

2. The method of claim 1 wherein the step of performing a filter response technique to identify patches of uniform reflectance within the image is carried out by performing a second derivative filter response technique.

3. The method of claim 2 wherein the second derivative filter response technique comprises an LoG filter mask.

4. The method of claim 1 wherein the step of performing a filter response technique to identify patches of uniform reflectance within the image is carried out by applying a filter mask to pixels of the image, and identifying patches of pixels having a predetermined filter response value.

5. The method of claim 4 wherein each patch comprises a preselected shape and size.

6. The method of claim 4 including the further step of merging overlapping patches of pixels having a predetermined filter response value.

7. The method of claim 1 wherein the filter response technique includes variable parameters.

8. The method of claim 7 including the further steps of selecting sets of values for the variable parameters, and repeating the step of performing a filter response technique to identify patches of uniform reflectance within the image, once per each one of the sets of values for the variable parameters.

9. The method of claim 8 including the further step of merging results from the step of repeating the step of performing a filter response technique to identify patches of uniform reflectance within the image.

10. The method of claim 1 including the further steps of identifying spatio-spectral information for the image, and utilizing the spatio-spectral information to identify single material token regions in the image.

11. The method of claim 10 including the further step of merging tokens identified by the step of utilizing the identified patches of uniform material reflectance to generate single material token regions, and single material token regions identified by the step of identifying spatio-spectral information for the image.

12. A computer system which comprises:
    a CPU; and
    a memory storing an image file; the CPU arranged and configured to execute a routine to perform a filter response technique to identify patches of uniform reflectance within an image depicted in the image file, utilize the identified patches of uniform material reflectance to generate single material token regions and list the single material token regions to process material and illumination aspects of the image.

13. A computer program product, disposed on a non-transitory computer readable media, the product including computer executable process steps operable to control a computer to: access an image file, perform a filter response technique to identify patches of uniform reflectance within an image depicted in the image file, utilize the identified patches of uniform material reflectance to generate single material token regions and list the single material token regions to process material and illumination aspects of the image.

* * * * *